May 26, 1964  E. ENK ETAL  3,134,807
PREPARATION OF METHYL-3-METHOXYPROPIONATE FROM KETENE
AND METHYLAL WITH HEXAFLUOROPHOSPHORIC
ACID AS A CATALYST
Filed Jan. 28, 1960
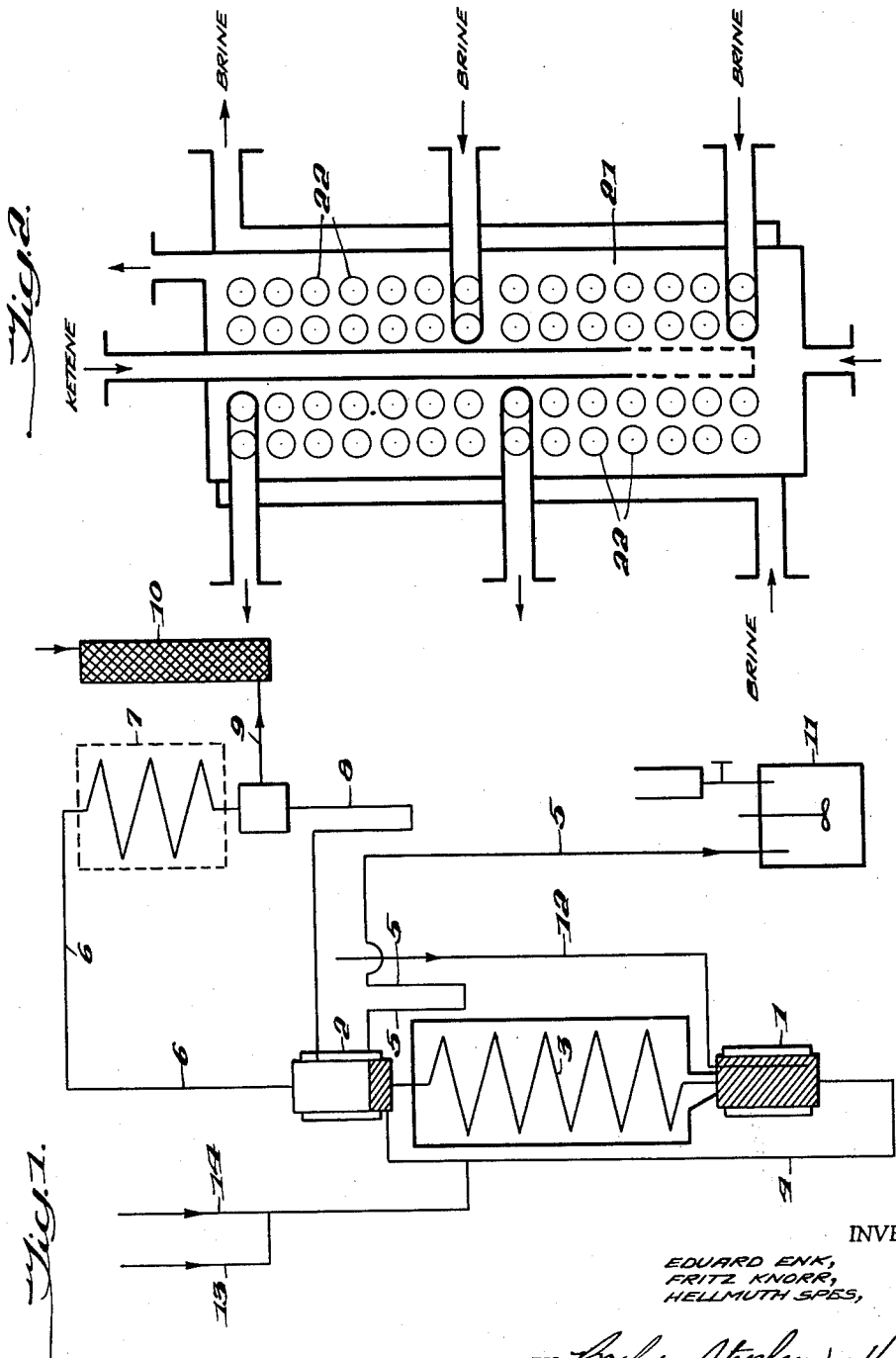
INVENTORS
EDUARD ENK,
FRITZ KNORR,
HELLMUTH SPES,
BY
ATTORNEYS United States Patent Office 3,134,807
Patented May 26, 1964

3,134,807
PREPARATION OF METHYL-3-METHOXYPRO-
PIONATE FROM KETENE AND METHYLAL
WITH HEXAFLUOROPHOSPHORIC ACID AS
A CATALYST
Eduard Enk, Fritz Knörr, and Hellmuth Spes, Burg-
hausen, Upper Bavaria, Germany, assignors to Wacker-
Chemie G.m.b.H., Munich, Germany
Filed Jan. 28, 1960, Ser. No. 5,223
Claims priority, application Germany Jan. 31, 1959
3 Claims. (Cl. 260—484)

The present invention relates to an improved process for the continuous production of beta-alkoxy substituted carboxylic acid esters from ketenes and acetals.

In our earlier application, Serial No. 831,342, filed August 3, 1959, now Patent No. 3,049,560, a process is described for the production of beta-alkoxy substituted carboxylic acid esters wherein ketenes and acetals are reacted in the presence of fluorides of elements of the 4th or 5th groups of the periodic system or complex fluoric acids of elements of the 3rd or 5th groups of the periodic system or mixtures of the substances indicated with fluorides of elements of the 3rd group of the periodic system in quantities of 0.1–10% by weight based on the total weight of the reactants.

In discontinuous operation of such process at a temperature of about 0–10° C., a catalyst concentration of about 1.5–2% based on the total weight of the reactants is required in order to obtain a complete conversion. At lower catalyst concentrations, the conversion is lowered and a portion of the ketene is carried out of the reaction vessel with the exhaust gas and therefore is lost to the reaction.

According to the present invention it was found that a lowering of the catalyst concentration favorably influences the reaction. The catalyst not only activates the reaction between the ketene and the acetal, but also undesirably has a cleaving action on the acetal. The alcohol which is produced in this side reaction uses up a portion of the ketene which then is no longer available for reaction with the acetal and alkyl acetate is produced.

As a sodium alcoholate solution is usually employed for neutralization of the catalyst, the quantity of such alcoholate used depends upon the catalyst concentration. When large quantities of sodium alcoholate are required, larger quantities of alcohol are introduced into the crude product, which in the case the acetal employed is methylal, produces azeotropic mixtures with the excess methylal and with the methyl acetate engendered by the cleavage of methylal which are difficult to separate.

In the case that a difluorophosphoric acid-boron trifluoride-catalyst is employed as the catalyst in a continuous process, the concentration of the catalyst can be lowered while still maintaining practically complete ketene absorption, if the reaction temperature is raised above 50° C. In this way the necessary reaction velocity required for a complete conversion is maintained even at lower catalyst concentrations.

On the other hand, when hexafluorophosphoric acid is employed as the catalyst in a continuous process, its concentration cannot be decreased by raising the reaction temperature, as such catalyst is rapidly deactivated at higher temperatures so that when higher reaction temperatures are used it is usually necessary to employ higher catalyst concentrations.

According to the invention it was unexpectedly found that it is also possible to attain complete ketene conversion at lower temperatures and low catalyst concentrations if the reaction is carried out with simultaneous use of intensive cooling, a long period of contact between the gas and the reaction liquid and with such a small quantity of reaction liquid that the catalyst is removed from the reaction vessel by the reaction liquid before it is inactivated.

The cooling employed must be sufficiently effective that the temperature does not rise substantially above 0° C. in the main reaction zone. It is also important that the liquid content of the reaction zone does not become too large despite the necessary cooling surfaces. In view of the catalyst deactivation which even takes place at this temperature, care must be taken that, to the greatest extent possible, only active catalyst is present in the reaction zone. This is achieved in that the quantity of liquid recycled is maintained so small that the catalyst is sluiced out before its inactivation.

The usual working apparatus, spray towers or cooled reactors are not satisfactory as, in view of the large quantities of liquid required to fill them, the required short time of stay of the catalyst cannot be achieved.

In order to attain as long a period of contact between the gas and the liquid from which the quantity of absorbed ketene depends, the gas may not simply bubble through the reaction liquid. It was found advantageous therefore to employ cooling coils having a low volume, through which the gas flows together with the liquid. This flow simultaneously maintains a liquid cycle in the apparatus.

In the accompanying drawing—

FIG. 1 diagrammatically shows apparatus meeting the requirements of the process according to the invention; and FIG. 2 diagrammatically shows a modification of the lower reaction vessel shown in FIG. 1.

In the apparatus shown in FIG. 1, the reactor consists of two brine cooled vessels 1 and 2 having exactly defined volumes, which are connected through an extended brine cooled cooling coil 3 of restricted cross-section. Conduit 4 serves for recycling the reaction liquid. The upper vessel 2 is connected to an exhaust gas cooler 7 over conduit 6 and with the neutralization vessel 11 over an overflow conduit 5. The condensate from exhaust gas cooler is returned to vessel 2 over conduit 8. The volume of the reactor is so selected that the desired time of stay is attained for a predetermined supply of ketene and methylal. Exhaust gas cooler 7 is connected to an acetic acid scrubbing tower 10 over conduit 9. Line 12 which serves to supply the ketene is connected to vessel 1, whereas lines 13 and 14, which serve to supply the methylal and the catalyst, open up into conduit 4.

The operation of such apparatus is as follows when ketene and a slight excess of methylal are reacted in the presence of the catalyst.

Before setting the reactor into operation, it is filled with the reaction product up to its overflow. Then the ketene, the catalyst and the methylal are supplied simultaneously respectively over lines 12, 13 and 14. The ketene bubbles through the lower reaction vessel 1 into the reaction coil 3 and takes along the reaction liquid, which thereby reaches the upper reaction vessel 2 and then again flows into lower reaction vessel 1 through conduit 4. The heat of reaction is to the greatest part set free in reaction coil 3 and easily can be removed from such coil in view of its relatively large cooling surface. This heat exchange is effectively supported by the circulation of the liquid. When larger quantities of ketene are employed, it can be that so much heat of reaction is already liberated in reaction vessel 1 that it cannot be satisfactorily withdrawn therefrom by simple jacket cooling. In this instance it has been found expedient to build in cooling coils in such vessel, the vessel being enlarged to compensate for the volume taken up by the cooling coils. Such a modification of reaction vessel 1 is exemplified in FIG. 2 wherein exteriorly brine cooled reaction vessel 21 is additionally cooled by interior brine cooled coils 22.

The reaction product is directly supplied to neutralization vessel 11 over the overflow conduit 5, and the pH thereof adjusted to 7–8 by addition of sodium methylate. The neutralization can also be effected with another neutralizing agent such as sodium carbonate.

The exhaust gas leaving exhaust gas cooler 7 is supplied over conduit 9 to the acetic acid scrubbing tower 10 where it is scrubbed and then exhausted to the atmosphere.

The advantages of this arrangement in which the cooler and the reaction space are constricted are the very small reaction volume required with simultaneous long contact between the gas and liquid and the intensive cooling achieved.

In place of the type of apparatus shown in the drawing, any other apparatus can be used as long as it provides the three essential requirements of the process according to the invention, namely, the very short time of stay of the liquid, the relatively long period of contact between the gas and the liquid and the intensive cooling.

The process according to the invention renders it possible to reduce the catalyst concentration to a fraction of that previously found necessary to produce good ketene absorption. At the same time, the quantity of by-product methyl acetate produced by cleavage of the methylal can be reduced about 72%. Furthermore, corresponding to the reduced catalyst concentration the quantity of sodium methylate required for the neutralization can be reduced to about $\frac{1}{7}$ of that required for the discontinuous process. The catalyst concentration employed according to the invention can be between 0.01–1.0% based upon the total weight of the reactants and preferably is between 0.1 and 0.6%.

The following examples will serve to illustrate the process according to the invention and its advantages.

*Example 1*

A reactor according to FIG. 1 was filled with 100 g. beta-methoxy propionic acid methyl ester, 8.7 g. of 95% methylal and 0.27 g. hexafluorophosphoric acid. Then 138 g. of ketene, 271 g. of 95% methylal and 1.068 g. of hexafluorophosphoric acid were added per hour. The reaction vessel 1 and reaction coil 3 were externally cooled in a cooling bath so that the temperature in reaction vessel 2 was −20° C. The liquid reactor content during the introduction of the ketene up to the overflow was 90 cc. The reaction product which continuously ran off over the overflow was collected in the neutralization vessel and its pH adjusted therein to 7–8 by the addition of sodium methylate. The exhaust gas leaving over brine cooled cooler 7 was free of ketene. The time of stay $$\frac{cc.\ reactor\ content}{cc./yield\ per\ hour}$$

in the reactor was about 13.5 minutes.

During a five hours' run the following were supplied:

```
Ketene_____ 690 g.=16.43 mol.
Methylal 100%_____ 1,295.0 g.=17.04 mol.
Methanol in the methylal_____ 67.0 g.=2.09 mol.
Hexafluorophosphoric acid_____ 5.73 g.
Beta-methoxy propionic acid
  methyl ester_____ 100 g.
                                 _____
                                 2,157.73 g.
Sodium methylate solution__ 45.6 g. (D=0.9325, 209.6 g./l.
                                                 NaOCH₃).
```

2175 g. of reaction product were produced which is 98.6% of the materials supplied. The catalyst concentration was 0.264%. Upon distillation of the reaction product the following were recovered:

275.0 g. (=3.61 mol) methylal 100%=21.2% of the methylal supplied 195.5 g. (=2.65 mol) methyl acetate—16.1% based upon the ketene supplied 40.0 g. methanol (from the neutralization)

1462.0 g. (=12.39 mol) beta-methoxy propionic acid methyl ester less the 100 g. originally supplied This corresponds to a 75.4% yield based upon ketene supplied and 72.6% based on methylal supplied.

The total methylal yield therefore was 93.8% and the total ketene yield was 91.5%.

When the lower reaction vessel 1 was enlarged to such an extent that the time of stay in the reactor was 157 minutes instead of 13.5 minutes, the ketene absorption after a short period of operation was so incomplete that the greater portion of the amount supplied escaped with the exhaust gas even when the quantity of catalyst was doubled (0.527%). When the catalyst quantity was quadrupled (1.04%) 11.3% of the ketene supplied still escaped with the exhaust gas.

*Example 2*

A reactor according to FIG. 1, the lower reaction vessel of which, however, was constructed according to FIG. 2 and whose liquid content during introduction of the ketene was 3055 cc., was filled with 3000 g. of beta-methoxy propionic acid methyl ester, 300 g. of 95% methylal and 8.3 g. of hexafluorophosphoric acid.

Then during a 417 minute run, 5310 g. of ketene, 9800 g. of 95% methylal and 40 g. of hexafluorophosphoric acid were continuously added per hour. The temperature in the lower reaction vessel was −3 to +1° C. and the temperature in the upper reaction vessel was −17 to −18° C. During the run a total of 36.92 kg. (=879.0 mol) of ketene, 68.5 kg. of 95% methylal (=65.070 kg.=856 mol methylal and 3.430 kg.=107.1 mol of methanol) and 0.2863 kg. of hexafluorophosphoric acid were added. The time of stay in the reactor amounted to 12 minutes. The reaction product which overflowed continuously was neutralized continuously which required a total of 1330 cc.=1240 g. of a sodium methylate solution (209.6 g./l. of sodium methylate). The total quantity of substances supplied amounted to 109.946 kg. and the catalyst concentration therein was 0.261%.

109.9 kg. of reaction product were obtained, that is, 99.9% of the amount of materials supplied. The exhaust gas leaving the apparatus was free of ketene. Upon distillation of the reaction product the following were recovered:

7.325 kg. (=96.4 mol) methylal 100%—11.27% of the quantity supplied 1.154 kg. (=36.1 mol) methanol (from the sodium methylate solution)

10.100 kg. (=136.5 mol) methyl acetate=15.52% based upon ketene supplied 88.000 kg. or respectively 85 kg. of beta-methoxy propionic acid methyl ester (after deduction of the 3 kg. originally supplied)=720 mol. This corresponds to an 82.0% yield based upon the ketene supplied and 84.1% based upon 100% methylal.

The total methylal yield therefore was 95.37% and the total ketene yield was 97.52%.

When, on the other hand, the inner cooling coils in the lower reaction vessel were not cooled, the reaction temperature in this vessel rose to 35–40° C. with simultaneous brown coloration of the reaction product. The overflowing reaction product smelled strongly of ketene and a large portion of ketene was not absorbed and was lost in the exhaust gas. Even when the catalyst concentration was increased to 2.05%, or approximately eightfold, it was not possible to obtain a better ketene absorption under these conditions.

We claim:
1. In a process for the continuous production of methyl-3-methoxypropionate by reacting ketene with methylal in the presence of hexafluorophosphoric acid as a catalyst, the steps which comprise recycling a liquid reaction medium comprising the methyl-3-methoxypropionate pro- duced and the catalyst through a reaction zone, continuously introducing the ketene, the methylal and the catalyst into said liquid reaction medium, the quantities of the ketene and methylal introduced being substantially equimolar and the catalyst concentration being 0.1–0.6% based upon the total weight of the reactants, intensively cooling the reaction mixture in said reaction zone to maintain a temperature substantially not above 0° C. during the main portion of the reaction, maintaining the ketene in contact with said liquid reaction medium in said reaction zone until it is substantially completely converted, maintaining a sufficiently small quantity of liquid in said recycling liquid reaction medium that it in its passage through the reaction zone leaves such zone before the catalyst therein is deactivated and continuously withdrawing a portion of the reaction medium leaving the reaction zone corresponding substantially to the reactants continuously supplied.

2. The process of claim 1 comprising in addition continuously neutralizing the portion of the reaction medium withdrawn.

3. The process of claim 1 in which the time of stay in the reaction zone is not over about 13.5 minutes.

References Cited in the file of this patent

UNITED STATES PATENTS

| | | |
|---|---|---|
| 1,935,627 | Falter | Nov. 21, 1933 |
| 2,007,799 | Gloersen | July 9, 1935 |
| 2,436,286 | Brooks | Feb. 17, 1948 |
| 2,910,503 | Fox | Oct. 27, 1959 |
| 3,049,560 | Enk et al. | Aug. 14, 1962 |